US012803462B2

(12) United States Patent
Zheng et al.

(10) Patent No.: US 12,803,462 B2
(45) Date of Patent: Nov. 17, 2026

(54) SOFT SWITCHING SOLID STATE TRANSFORMERS IMPLEMENTING VOLTAGE STRESS MITIGATION TECHNIQUES

(71) Applicant: Georgia Tech Research Corporation, Atlanta, GA (US)

(72) Inventors: Liran Zheng, Atlanta, GA (US); Rajendra Prasad Kandula, Atlanta, GA (US); Deepak M. Divan, Atlanta, GA (US)

(73) Assignee: GEORGIA TECH RESEARCH CORPORATION, Atlanta, GA (US)

(*) Notice: Subject to any disclaimer, the term of this patent is extended or adjusted under 35 U.S.C. 154(b) by 325 days.

(21) Appl. No.: 18/571,025

(22) PCT Filed: Jul. 13, 2022

(86) PCT No.: PCT/US2022/073683

§ 371 (c)(1),
(2) Date: Dec. 15, 2023

(87) PCT Pub. No.: WO2023/288248

PCT Pub. Date: Jan. 19, 2023

(65) Prior Publication Data

US 2024/0313628 A1 Sep. 19, 2024

Related U.S. Application Data

(60) Provisional application No. 63/221,285, filed on Jul. 13, 2021.

(51) Int. Cl.
*H02M 7/48* (2007.01)
*H02M 1/00* (2007.01)
*H02M 1/12* (2006.01)

(52) U.S. Cl.
CPC ....... *H02M 7/4807* (2013.01); *H02M 1/0058* (2021.05); *H02M 1/0074* (2021.05); *H02M 1/123* (2021.05); *H02M 1/126* (2013.01)

(58) Field of Classification Search
CPC .. H02M 1/0058; H02M 1/0074; H02M 1/123; H02M 1/126; H02M 7/4807
See application file for complete search history.

(56) References Cited

U.S. PATENT DOCUMENTS 2,412,893 A 12/1946 Lee
3,881,137 A 4/1975 Thanawala
(Continued)

FOREIGN PATENT DOCUMENTS

WO 2020023471 A1 1/2020

OTHER PUBLICATIONS

International Search Report and Written Opinion from Application No. PCT/US2022/073683 dated Jan. 27, 2023.

*Primary Examiner* — Jue Zhang
(74) *Attorney, Agent, or Firm* — TROUTMAN PEPPER LOCKE LLP; Ryan A. Schneider; Elsie Yang

(57) ABSTRACT

An exemplary embodiment of the present disclosure provides a soft-switching solid-state power transformer comprising a transformer, first and second auxiliary resonant circuits, first and second current-source inverter (CSI) bridges, and a first transformer capacitor. The first auxiliary resonant circuit can be coupled to a first winding connection of the transformer. The first auxiliary resonant circuit can comprise a resonant capacitor coupled across the first winding connection, and a resonant inductor coupled across the first winding connection in parallel with the resonant capacitor. The first CSI bridge can be coupled to the first auxiliary resonant circuit. The second auxiliary resonant circuit can be coupled to the second winding connection of the transformer. The second CSI bridge can be coupled to the second
(Continued)

auxiliary resonant circuit. The first transformer capacitor can be coupled to a high voltage side of the first winding connection and a ground.

14 Claims, 16 Drawing Sheets

(56) References Cited

U.S. PATENT DOCUMENTS

| | | | | |
|---|---|---|---|---|
| 5,008,795 | A | 4/1991 | Parsley et al. | |
| 5,093,613 | A | 3/1992 | Diepenmaat | |
| 2006/0227582 | A1* | 10/2006 | Wei | H02M 1/126<br>363/126 |
| 2019/0280586 | A1* | 9/2019 | Chen | H02M 7/483 |
| 2022/0270816 | A1* | 8/2022 | Takeda | H01F 30/10 |

* cited by examiner

SOFT SWITCHING SOLID STATE TRANSFORMERS IMPLEMENTING VOLTAGE STRESS MITIGATION TECHNIQUES

CROSS-REFERENCE TO RELATED APPLICATIONS

This application claims the benefit of U.S. Provisional Application Ser. No. 63/221,285, filed on 13 Jul. 2021, which is incorporated herein by reference in its entirety as if fully set forth below.

GOVERNMENT LICENSE RIGHTS

This invention was made with government support under Agreement No. DE-AR0000899, awarded by ARPA-E. The government has certain rights in the invention.

FIELD OF THE DISCLOSURE

The various embodiments of the present disclosure relate generally to soft switching solid state transformers.

BACKGROUND

It is desirable to replace conventional line-frequency transformers with solid-state transformers (SST) or power electronic transformers (PET) in various applications because of their generally smaller weight, smaller size, and increased controllability. Most of the prior SST research has focused on medium-frequency transformer (MFT) design, control design, lightning protection, converter topology, and various applications including renewable energy, electric vehicle charging, motor drives, etc. Little research, however, has focused on grounding related issues of the SST, which are critical for safe and reliable operation in utility applications. Furthermore, due to the complexity of large amount of parasitics and the interaction mechanism between them, the grounding issues can be challenging. Accordingly, there is a need for improved transformers to address the various grounding issues present in conventional topologies.

BRIEF SUMMARY

An exemplary embodiment of the present disclosure provides a soft-switching solid-state power transformer comprising a transformer, a first auxiliary resonant circuit, a first current-source inverter (CSI) bridge, a second auxiliary resonant circuit, a second CSI bridge, and a first transformer capacitor. The transformer can comprise first and second winding connections. The first auxiliary resonant circuit can be coupled to the first winding connection of the transformer. The first auxiliary resonant circuit can comprise a resonant capacitor coupled across the first winding connection, and a resonant inductor coupled across the first winding connection in parallel with the resonant capacitor. The first CSI bridge can be coupled to the first auxiliary resonant circuit. The first CSI bridge can comprise reverse blocking switches configured to conduct current in one direction and block voltage in both directions. The second auxiliary resonant circuit can be coupled to the second winding connection of the transformer. The second CSI bridge can be coupled to the second auxiliary resonant circuit. The second CSI bridge can comprise reverse blocking switches configured to conduct current in one direction and block voltage in both directions. The first transformer capacitor can be coupled to a high voltage side of the first winding connection and a ground.

In any of the embodiments disclosed herein, the first transformer capacitor can be configured to divert current away from one or more semiconductors of the first CSI bridge.

In any of the embodiments disclosed herein, the power transformer can further comprise a second transformer capacitor coupled to a low voltage side of the of the first winding connection and the ground.

In any of the embodiments disclosed herein, the first transformer capacitor can have a capacitance equal to a capacitance of the second transformer capacitor.

In any of the embodiments disclosed herein, the first and second transformer capacitors can be configured to first divert current away from one or more semiconductors of the first CSI bridge.

In any of the embodiments disclosed herein, the power transformer can further comprise a third transformer capacitor coupled to a high voltage side of the second winding connection and the ground.

In any of the embodiments disclosed herein, the power transformer can further comprise a fourth transformer capacitor coupled to a low voltage side of the second winding connection and the ground.

In any of the embodiments disclosed herein, the fourth transformer capacitor can have a capacitance equal to a capacitance of the third transformer capacitor.

In any of the embodiments disclosed herein, the power transformer can further comprise a second soft-switching solid-state power transformer of claim coupled in parallel with the soft-switching solid-state power transformer of claim.

In any of the embodiments disclosed herein, the power transformer can further comprise a rectifier filter coupled to the first CSI bridge. The rectifier filter can comprise a rectifier capacitor, a rectifier inductor in parallel with the rectifier capacitor, and a dampening resistor in parallel with the rectifier inductor.

In any of the embodiments disclosed herein, the power transformer can further comprise a fourth capacitor coupled to the first CSI bridge and the ground. The fourth capacitor can be connected in parallel with the rectifier filter.

In any of the embodiments disclosed herein, the dampening resistor can be configured to dampen LC oscillation between the rectifier filter and inductances in a grounding loop of the transformer.

In any of the embodiments disclosed herein, the fourth capacitor can be configured to increase an equivalent capacitance of the first CSI bridge and the transformer.

In any of the embodiments disclosed herein, the first CSI bridge can comprise a plurality of phase legs, and the power transformer can further comprise a rectifier filter coupled to each of the plurality of phase legs. Each of the rectifier filters can comprise a rectifier capacitor, a rectifier inductor in parallel with the rectifier capacitor, and a dampening resistor in parallel with the rectifier inductor.

In any of the embodiments disclosed herein, the power transformer can further comprise a distinct capacitor coupled to each of the plurality of phase legs of the CSI bridge and the ground, and each of the distinct capacitors can be in parallel with a corresponding rectifier filter.

In any of the embodiments disclosed herein, the fourth capacitor can be configured to increase an equivalent capacitance of the first CSI bridge and the transformer.

Another embodiment of the present disclosure provides a soft-switching solid-state power transformer, comprising a transformer, first and second auxiliary resonant circuits, first and second CSI bridges, and a rectifier filter. The transformer can comprise first and second winding connections. The first auxiliary resonant circuit can be coupled to the first winding connection of the transformer. The first auxiliary resonant circuit can comprise a resonant capacitor and a resonant inductor. The resonant capacitor can be coupled across the first winding connection. The resonant inductor can be coupled across the first winding connection in parallel with the resonant capacitor. The first CSI bridge can be coupled to the first auxiliary resonant circuit. The first CSI bridge can comprise reverse blocking switches configured to conduct current in one direction and block voltage in both directions. The second auxiliary resonant circuit can be coupled to the second winding connection of the transformer. The second CSI bridge can be coupled to the second auxiliary resonant circuit. The second CSI bridge can comprise reverse blocking switches configured to conduct current in one direction and block voltage in both directions. The rectifier filter can be coupled to the first CSI bridge. The rectifier filter can comprise a rectifier capacitor, a rectifier inductor, and a dampening resistor. The rectifier inductor can be in parallel with the rectifier capacitor. The dampening resistor can be in parallel with the rectifier inductor.

In any of the embodiments disclosed herein, the power transformer can further comprise a capacitor coupled to the first CSI bridge and the ground. The capacitor can be in parallel with the rectifier filter.

In any of the embodiments disclosed herein, the dampening resistor can be configured to dampen LC oscillation between the rectifier filter and inductances in a grounding loop of the transformer.

In any of the embodiments disclosed herein, the capacitor can be configured to increase an equivalent capacitance of the first CSI bridge and the transformer.

In any of the embodiments disclosed herein, the first CSI bridge can comprise a plurality of phase legs, and the rectifier filter can be coupled to a first phase leg in the plurality of phase legs. The power transformer can further comprise one or more additional rectifier filters coupled to the one or more additional phase legs in the plurality of phase legs.

In any of the embodiments disclosed herein, the dampening resistors of each of the plurality of rectifier filters can be configured to dampen LC oscillation between the rectifier filter and inductances in a grounding loop of the transformer.

In any of the embodiments disclosed herein, the capacitor can be coupled to the first phase leg, the power amplifier can further comprise one or more additional capacitors coupled to each of the one or more additional phase legs in the plurality of phase legs of the CSI bridge and the ground. Each of the one or more additional capacitors can be in parallel with a corresponding rectifier filter.

In any of the embodiments disclosed herein, the one or more additional capacitors can be configured to increase an equivalent capacitance of the first CSI bridge and the transformer.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIG. 7A provides an equivalent circuit. FIG. 7B provides a further simplified equivalent circuit without the MV ground. FIG. 7C provides a further simplified equivalent circuit with the MV ground to illustrate the cause of the voltage stress when $i_m$ concentrates on the MV side of the transformer, which is a worst-case scenario. FIG. 7D provides a solution of adding capacitors to reduce the voltage variation/stress across devices, in accordance with an exemplary embodiment of the present disclosure. FIG. 7E provides a simplified equivalent circuit when $i_m$ concentrates on the LV side of the transformer. In the analysis of cause 1 in FIGS. 7A-E, the LV side is assumed solidly grounded, while the LV grounding impedance is considered in cause 2.

FIG. 10A provides a schematic for a single module case. FIGS. 10B-C provides schematics for multi-module cases, in which FIG. 10B and FIG. 10C are equivalent concerning the stress mitigation, i.e., filter capacitance is a short-circuit at the high frequency of interest. $C_{x2}$ in FIG. 10C can block lower line-frequency voltage. When the transformer turns ratio is large, e.g., 6:1 in the prototype, a fraction of LV voltage reflected to the MV side causes negligible stress, and the MV-side $C_{x2}$ may not be needed.

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

The present disclosure addresses the issue and the mitigation method of the additional device voltage stress from the grounding-loop current in current-source SST. Compared to multi-stage voltage-source SST, current-source SST can feature single-stage power conversion with an inductive dc link and benign failure modes. In current-source SST, flyback-like operation means that MFT magnetizing current flows through the semiconductor devices on only one side of the MFT at a time to engage the input or the output. The voltages across the semiconductor devices, when they are not engaged with the input or the output, can be driven by parasitic grounding current beyond the normal voltage if not appropriately mitigated.

Soft-switching solid-state transformer (S4T) topologies belong to the current-source SST category, i.e., the S4T with reduced conduction loss and the modular S4T (M-S4T). The S4T is disclosed in U.S. Pat. No. 11,309,802, entitled "Transformers, Converters, and Improvements to the Same," the entire contents of which are incorporated herein by reference as if fully set forth below. As explained in more detail below, various embodiments of the present disclosure provide improvements to the S4T disclosed therein to mitigate voltage stress experienced by those devices in certain configurations.

Figure 10A:
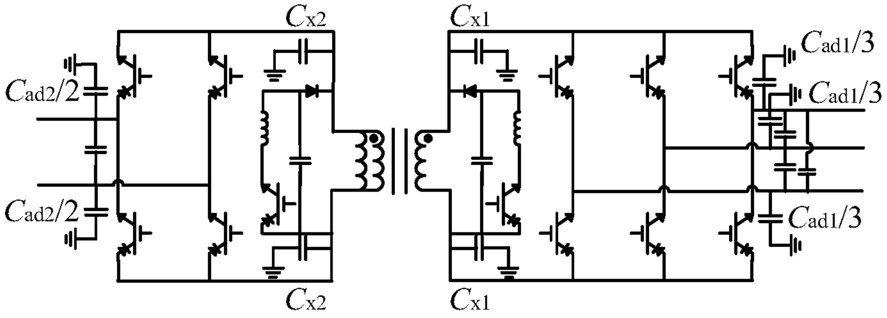
FIGS. 10A-C provide schematics of soft-switching solid-state power transformers implementing voltage stress mitigation techniques, in accordance with exemplary embodiments of the present disclosure.
Figure 10B:
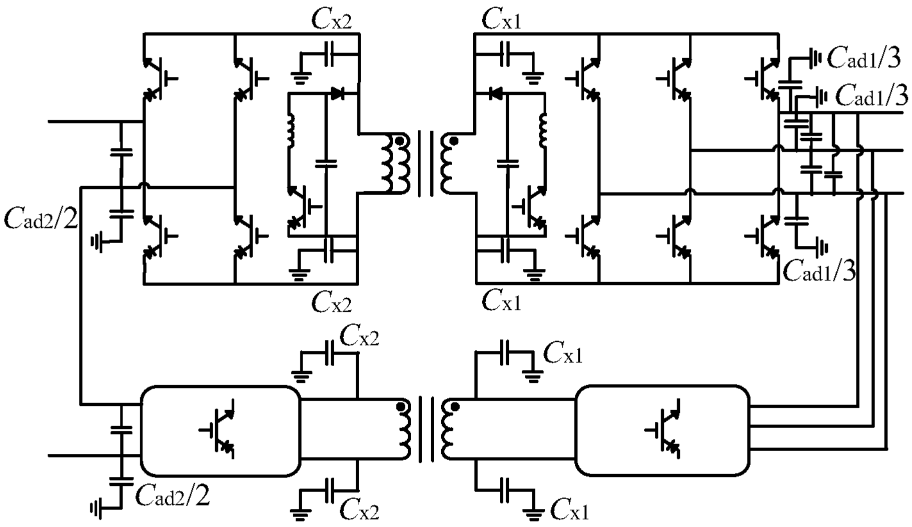
Figure 10C:
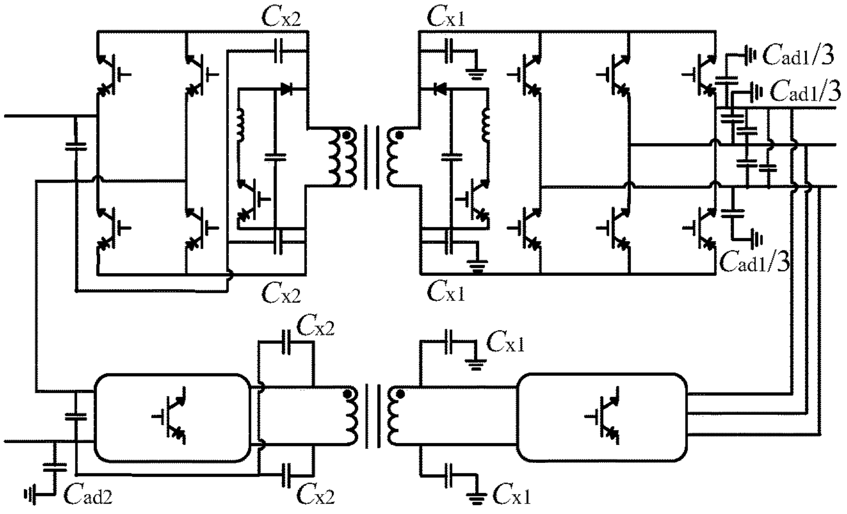

The S4T and the M-S4T require a special modulation scheme to achieve the zero-voltage switching (ZVS) state and mitigate the potential device voltage stress from differential-mode operation of the converter. However, the common-mode grounding-loop-induced voltage stress has not been discovered or studied in existing literature of any current-source SST or S4T. Rather, in conventional topologies of the S4T, the input source or the LV rectifier was grounded, while the output load or the MV resistor bank was ungrounded. But such topologies are not feasible for utility applications, in which both the LV side and the MV side are grounded. Accordingly, as discussed in more detail below, the present disclosure provides a voltage stress suppression technique that comprises adding grounding capacitors to the transformer terminal and the input terminal. FIGS. 10A-C, which will be discussed below provide S4T topologies that implement voltage stress mitigation techniques, in accordance with exemplary embodiments of the present disclosure.

M-S4T Model with Parasitics

Figure 1:
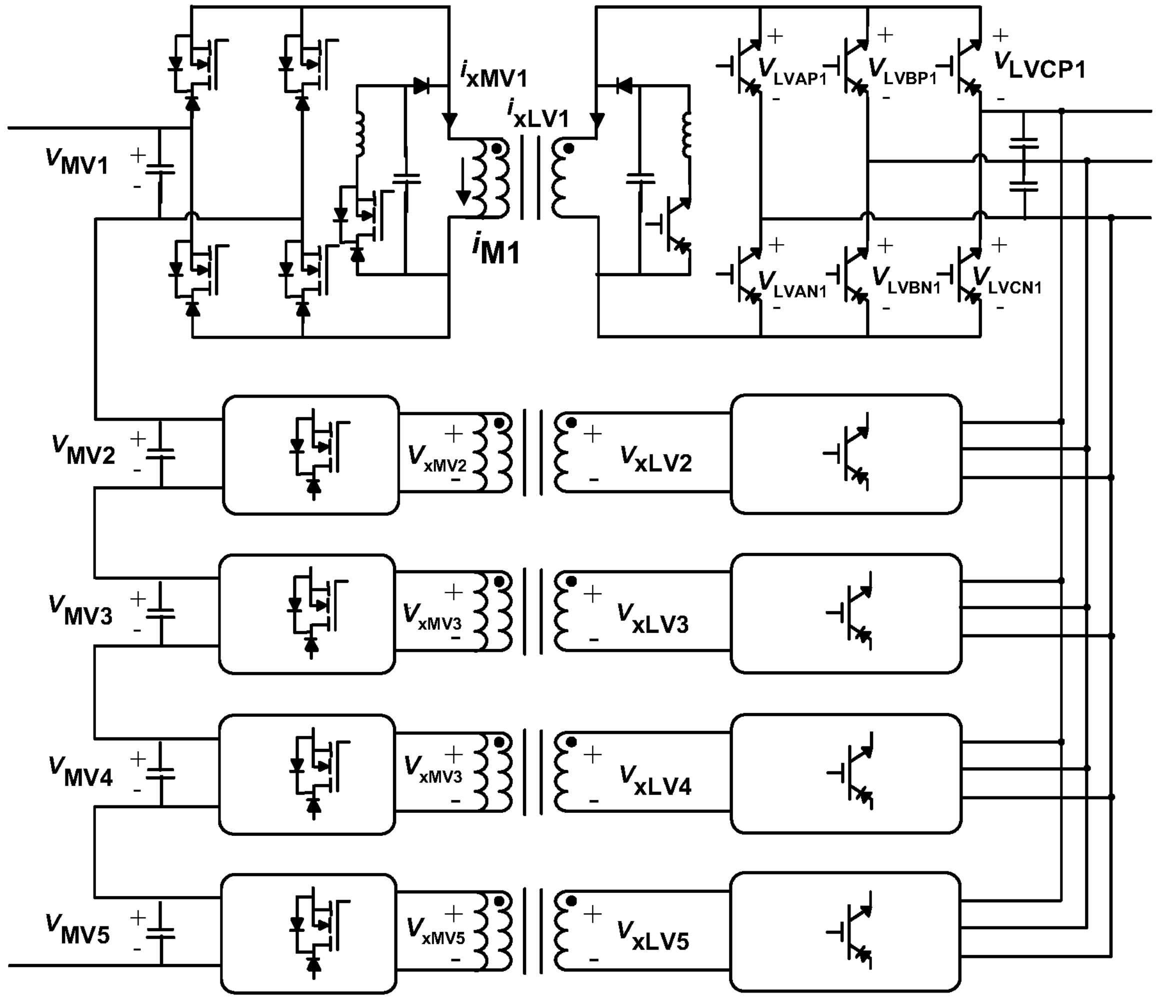
FIG. 1 (Prior Art)
FIG. 1 provides a schematic of a conventional modular soft-switching solid-state transformer (M-S4T), wherein the M-S4T is a current-source converter with magnetizing inductance $L_m$ as its de link.

As shown in FIG. 1, the conventional S4T is a single-stage current-source SST. Two current-source inverter (CSI) bridges based on reverse-blocking devices are located on both sides of the medium-frequency transformer (MFT) to interface the input and the output. Also, resonant capacitors, resonant inductor, auxiliary leakage diodes, and switches are placed on both sides of the MFT to achieve ZVS and manage the MFT leakage inductance. Multiple modules can be connected input-series output-parallel (ISOP) as a M-S4T to scale for higher voltage. Take module 1 in FIG. 1 as an example, the basic operation principle is to impose $v_{MV1}$ across the dc-link inductor ($L_m$) to energize $L_m$ with the input bridge and later release the energy from $L_m$ to the output through the output bridge, where the space vector of each phase can be modulated like a CSI.

Figure 2A:
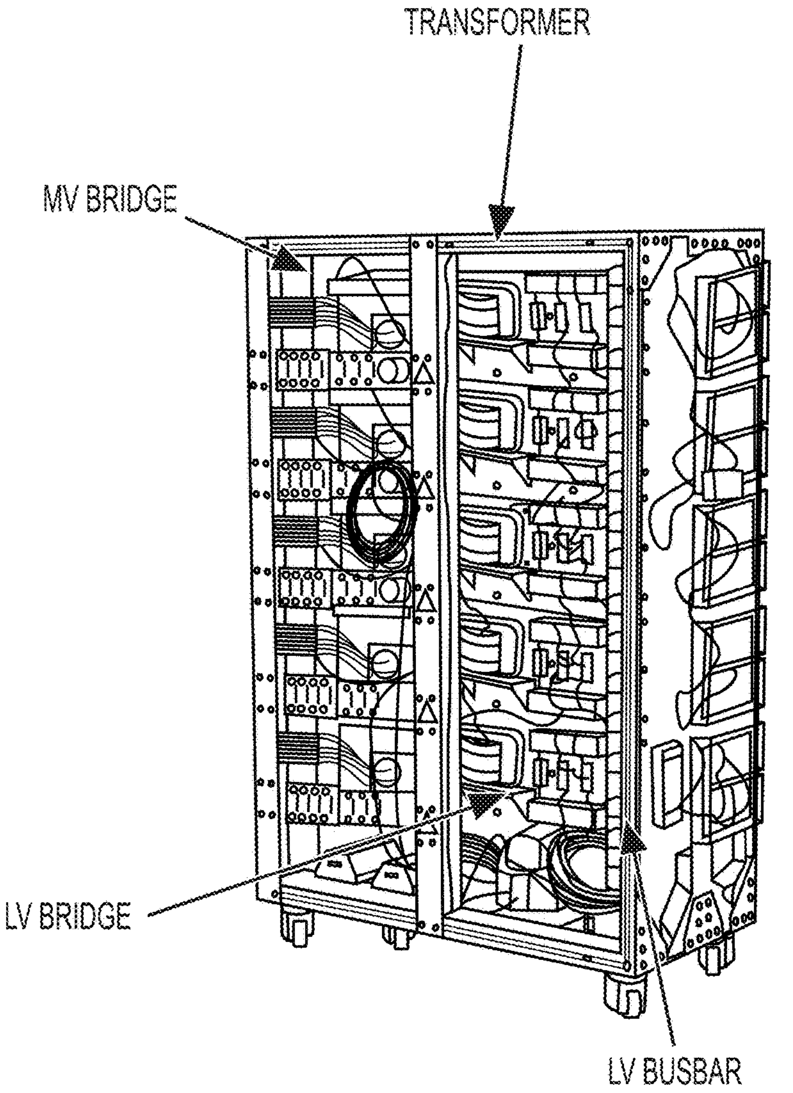
FIG. 2A provides a photo of a conventional M-S4T prototype.
Figure 2B:
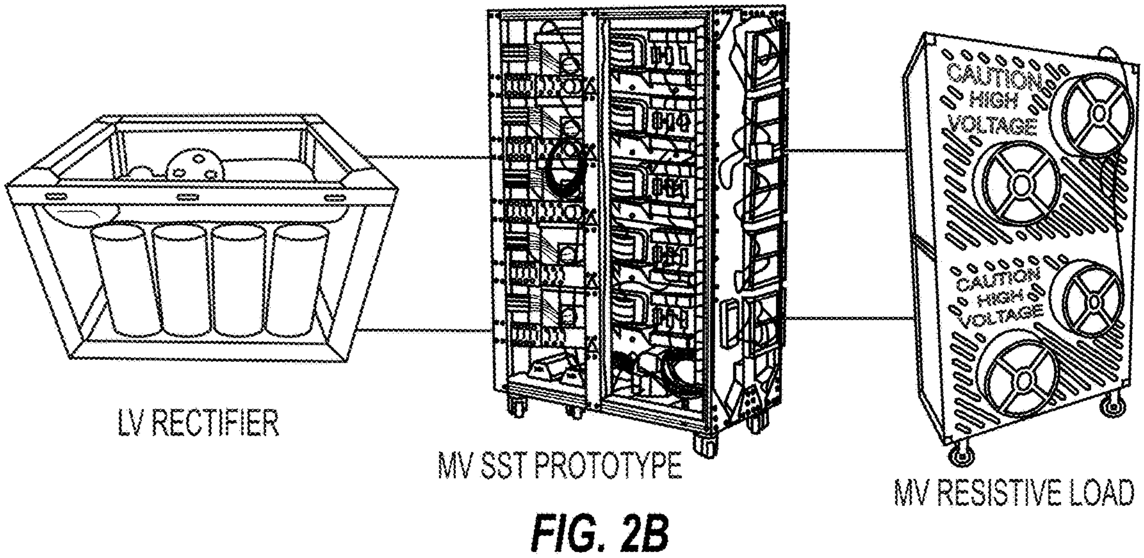
FIG. 2B provides a photograph of an experimental setup with the M-S4T.
Figure 3:
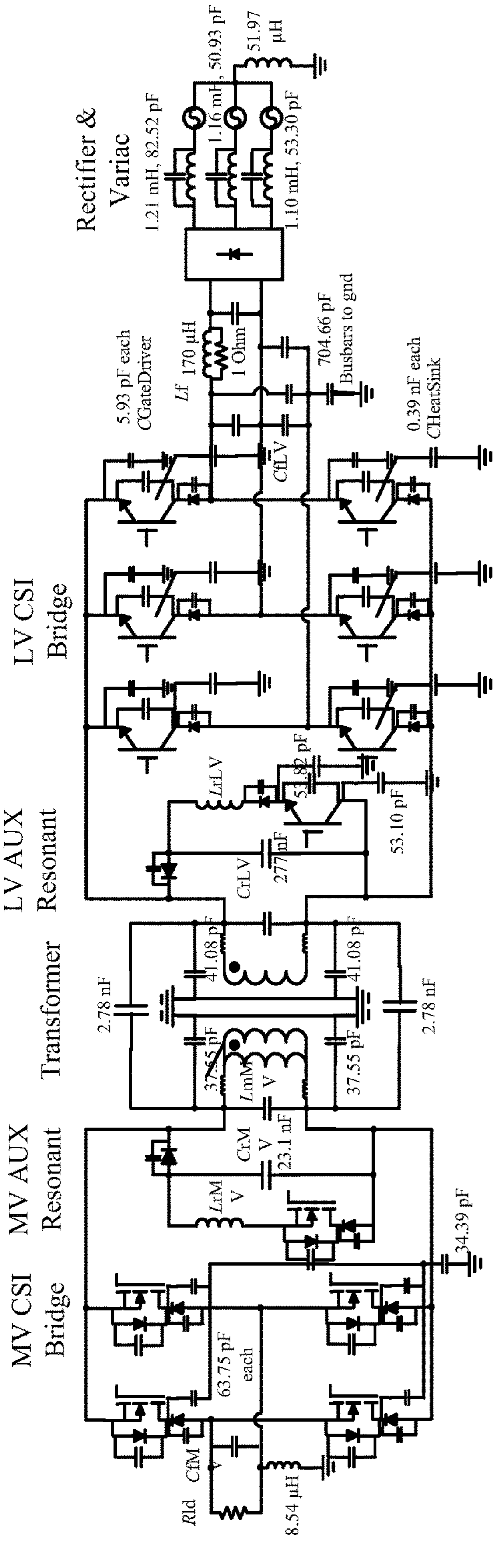
FIG. 3 provides a schematic of the M-S4T of FIGS. 1 and 2A with parasitics from direct measurements or datasheets. One of the modules of the M-S4T is illustrated in FIG. 3. Capacitances of MV and LV devices are nonlinear and obtained from manufacturer. The values corresponding to the rated operating point are shown.

Photographs of an M-S4T experimental prototype and experimental setup are shown in FIGS. 2A-B, where five modules are connected ISOP for higher voltage. The parasitic model of the M-S4T prototype can be characterized comprehensively as shown in FIG. 3. A rectifier-variac set supplies two LV phases of the M-S4T, and the MV side is coupled to a MV resistor load. The remaining LV phase is connected to a buffer capacitor bank to buffer the double-line-frequency power ripple from single-phase MV output. Filter capacitance $C_{fMV}$ and $C_{fLV}$ can be much larger than parasitic capacitances and acts effectively as a short circuit in the later analysis. Therefore, the values of such parameters are not marked in FIG. 3. The parasitics of the converter bridges, the MFT, the rectifier's filter inductors, etc. are measured using an impedance analyzer. The grounding-loop inductances between the variac and the LV-side of the prototype and between the MV resistor load and the LV-side of the prototype were measured to be 51.97 μH and 8.54 μH, respectively, as marked in FIG. 2.

Figure 4A:
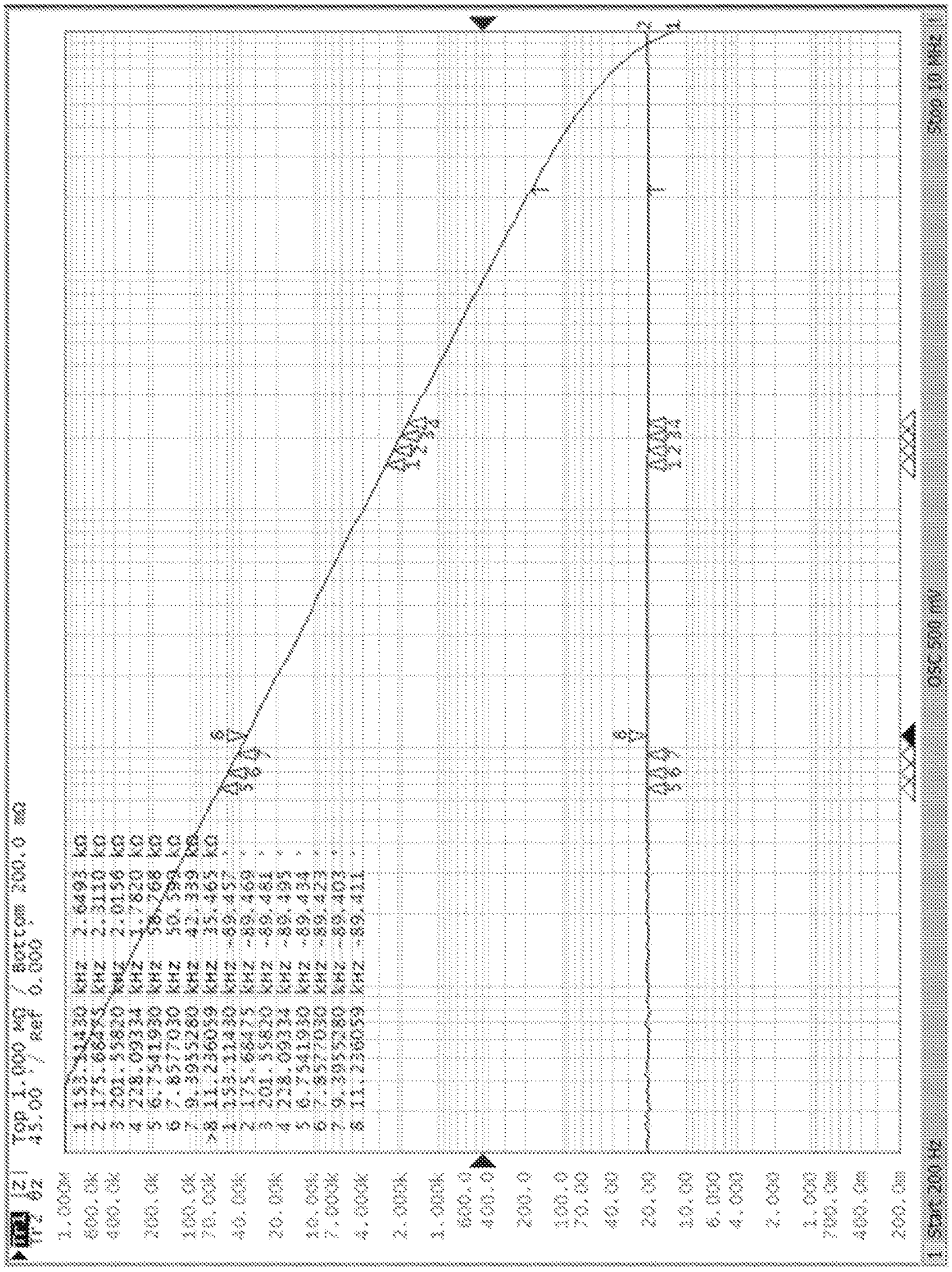
FIG. 4A provides a plot of impedance measurement results, and FIG. 4B provides a photograph of the LV device baseplate and the heatsink, in accordance with an exemplary embodiment of the present disclosure. The parasitic capacitance was measured to be 0.39 nF between each baseplate and the heatsink.
Figure 4B:
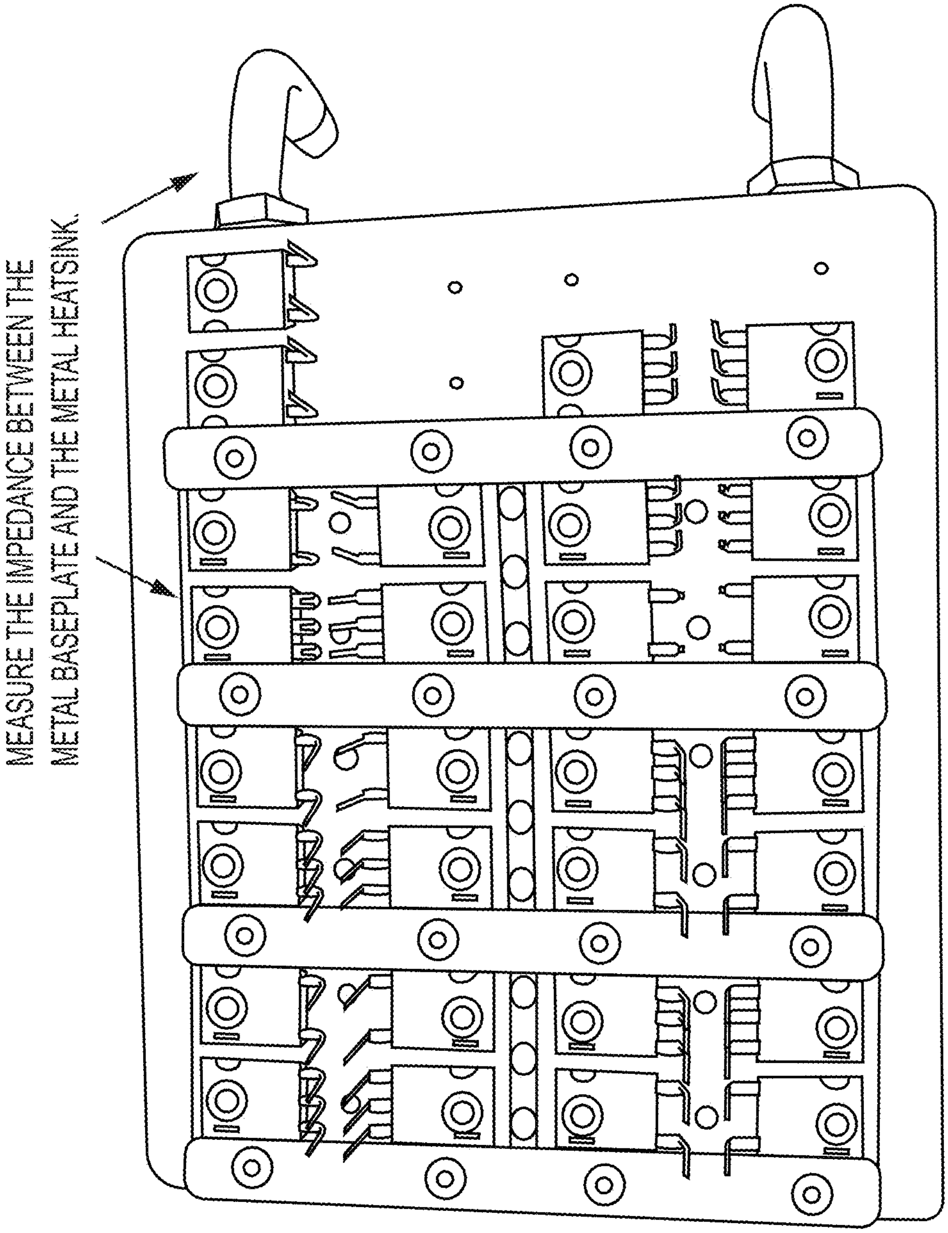

Note that a customized 3.3 kV SiC module with its baseplate floating was used on the MV side, which provides small capacitance (63.75 pF) for the isolation between the device die and the module baseplate. However, on the LV side, a self-assembled device module based on discrete TO-247 devices was used. The baseplate of the discrete devices is also the cathode of the diode and the collector of the IGBT. As the LV heatsink is solidly grounded, large parasitic capacitance (0.39 nF) exists between each baseplate and the ground. FIG. 4A illustrates the impedance measurement results between the LV device baseplate and the LV heatsink. FIG. 4B shows a photo of the self-assembled LV device module, which corresponds to the LV devices behind the printed circuit board of the LV bridge in FIG. 2A. Six baseplates in FIG. 4B accommodate the devices of the three LV phases in each M-S4T module.

Figure 5:
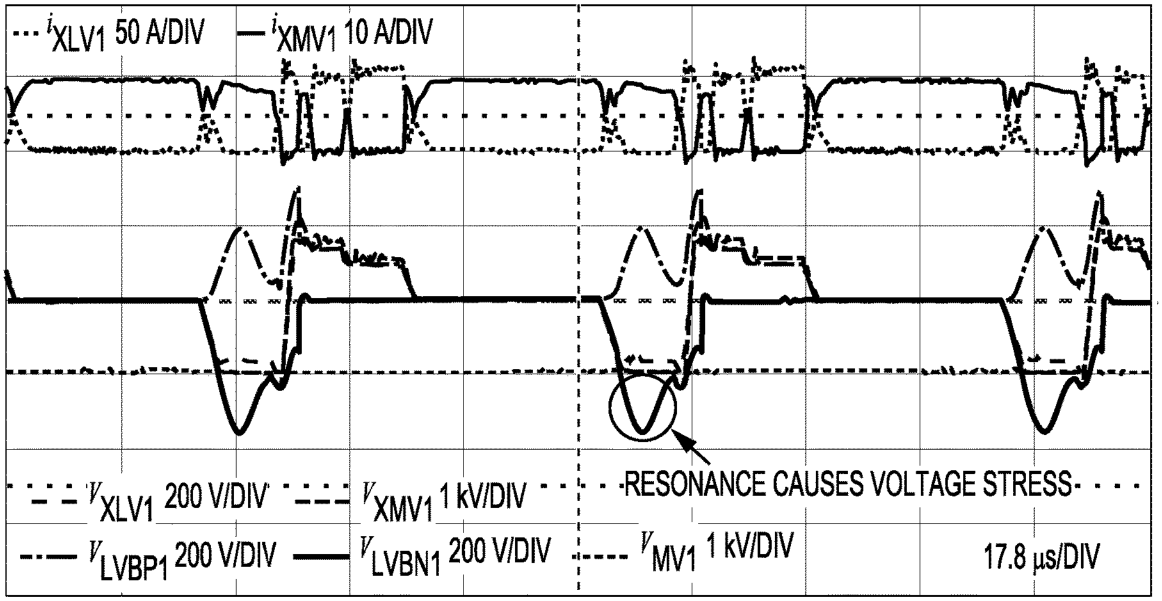
FIG. 5 provides single-module S4T waveforms at 1 kV peak without the exemplary voltage stress mitigation techniques disclosed herein, wherein the existence of the voltage stress issue is verified.
Figure 6:
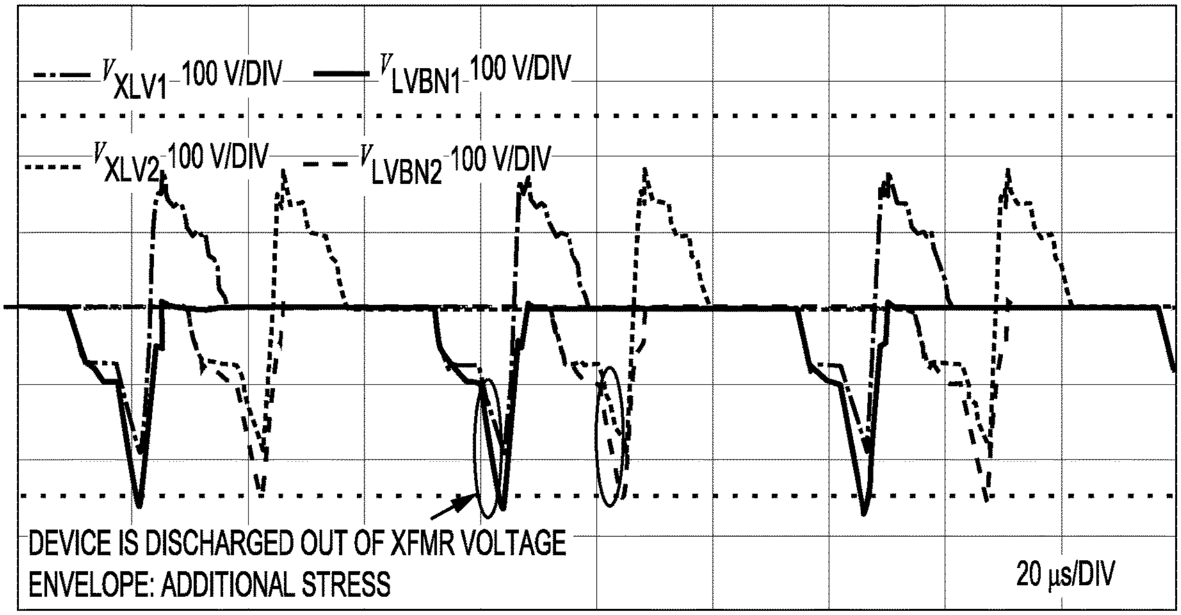
FIG. 6 provides stacked-module M-S4T waveforms without the exemplary voltage stress mitigation techniques disclosed herein. Three modules are under test, two of which are shown in the waveforms. The existence of the voltage stress issue is verified.

Equivalent Circuits to Analyze the Voltage Stress: Phenomenon, Causes, and Solution The experimental waveforms of the M-S4T under a single-module test and a stacked-module test are shown in FIGS. 5-6. In FIG. 5, the S4T operates at 1 kV peak MVAC voltage. It can be observed that the voltage stress across device LVBN1 is as high as 360 V, while the LV source voltage is below 200 V. The voltage stress here is about 180%. The voltage waveforms show a LC-type resonance. The stress occurs during the MV active vector, when the dc-link current $i_{m1}$ equals $i_{xMV1}$ and $v_{MV1}$ is imposed across $L_m$. This phenomenon is due to the LC resonance in the LV-side grounding loop. In FIG. 6, the M-S4T operates at 1.5 kV peak MVAC voltage with three ISOP modules. The LVBN1 device voltage is discharged during a ZVS transition state beyond (75 V more than) the envelope of $v_{xLV1}$. The voltage stress here is about 140%. This excessive discharge phenomenon is due to the dc-link current leaking through the LV device capacitance from the MV side to the LV side through grounding cables.

Cause 1 and Solution

Figure 7A:
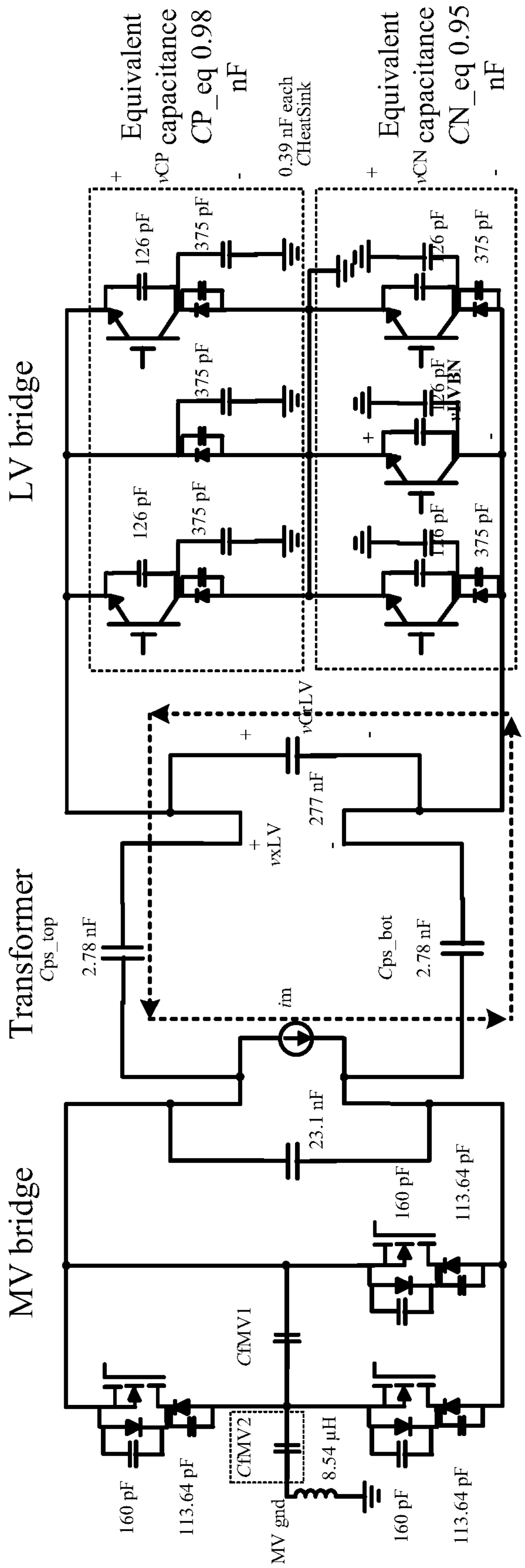
FIGS. 7A-E provide an illustration of the Cause 1 of voltage stress, such that a portion of dc-link current ($i_m$) flows through device and heatsink capacitances via grounding cables.
Figure 7B:
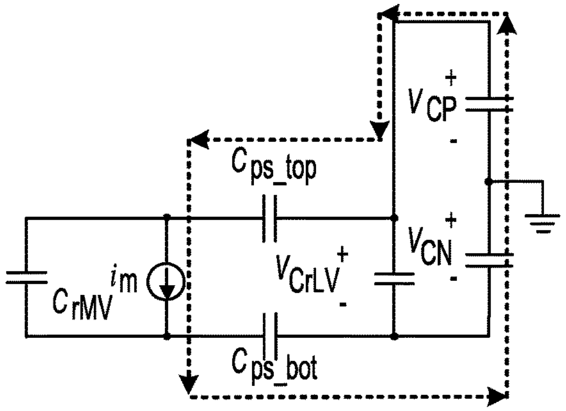

The detailed analysis and a solution for the excessive discharge phenomenon, referred to herein as "cause 1," will now be discussed. The S4T has a ZVS transition state to achieve the ZVS, when the de-link inductor ($L_m$) and its current ($i_m$) discharge $C_{rLV}$ and $C_{rMV}$ in FIG. 3 until $C_{rLV}$/$C_{rMV}$ voltage equals $C_{fLV}$/$C_{fMV}$ voltage for an incoming LV/MV vector. Once $v_{CrLV}$/$v_{CrMV}$ equals $v_{CfLV}$/$v_{CfMV}$, the corresponding switches for the space vector can be turned on with zero voltage, i.e., $v_{CrLV}$-$v_{CfLV}$/$v_{CrMV}$-$v_{CrMV}$ across them. The ZVS transition state has been verified in FIG. 6 to be a problematic state during which grounding-loop currents result in additional device voltage stress. The equivalent circuit of the full parasitic model in FIG. 3 under the ZVS transition state is shown in FIG. 7 to illustrate cause 1. Because this equivalent circuit is used to analyze $i_m$ current leakage among the capacitive network in the ZVS transition state, filter capacitors $C_{fMV}$ and $C_{fLV}$ with very small impedance compared to parasitic capacitors can be considered as short circuits. Moreover, suppose that multiple modules are cascaded in series on the MV side like FIG. 1 and this module is the second module from the ground. This module will have another filter capacitor $C_{fMV2}$ on its path to the MV ground as shown in FIG. 7A. Similar to $C_{fMV1}$, $C_{fMV2}$ can also be regarded as a short circuit, which means that the second cascaded module is confronted with the similar situation as the first module in the context of the ground-leakage-current-induced voltage stress issue. If the MV side is ungrounded as shown in FIG. 7B, both $C_{P\_eq}$ and $C_{N\_eg}$ are discharged by $i_m$. We have $\Delta v_{CN}$<0, $\Delta v_{CP}$<0, $\Delta v_{Cr\_LV}$<0, and Equation 1 holds.

$$|\Delta v_{CN}| = |\Delta v_{LVBN}| = |\Delta v_{CrLV} - \Delta v_{CP}| = |\Delta v_{CrLV}| - |\Delta v_{CP}| = |\Delta v_{xLV}| - |\Delta v_{CP}| < |\Delta v_{xLV}| \quad \text{Equation 1}$$

Therefore, the LVBN voltage variation in the ZVS transition state will be smaller than and hence within the envelope/voltage variation of $v_{xLV}$.

Figure 7C:
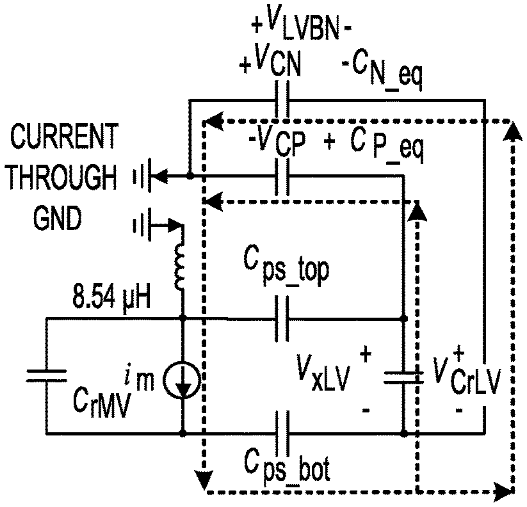
Figure 7D:
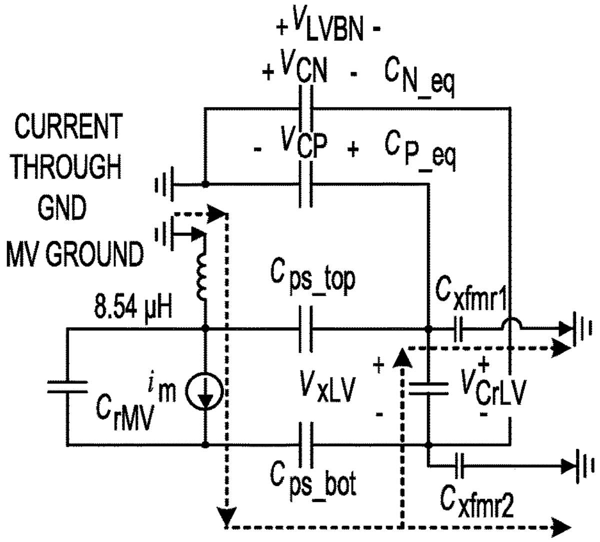

With the MV grounded, however, as shown in the simplified equivalent circuit in FIG. 7C, the ground current, i.e., a portion of $i_m$ will cause $C_{P\_eq}$ to be charged and $C_{N\_eq}$ to be discharged. In other words, $\Delta v_{CN}$ and $\Delta v_{CP}$ will move in opposite directions. Though the sum of $\Delta v_{CN}$ and $\Delta v_{CP}$ is equal to $\Delta v_{CrLV}$, $\Delta v_{CN}$ will be greater than $\Delta v_{Cr\_LV}$ in this case, which means increased voltage stress compared to the ungrounded case. Analytically, it can be expressed as $\Delta v_{CN}$<0, $\Delta v_{CP}$>0, $\Delta v_{Cr}$<0, and Equation 2 holds.

$$|\Delta v_{CN}| = |\Delta v_{LVBN}| = |\Delta v_{CrLV} - \Delta v_{CP}| = |\Delta v_{CrLV}| + |\Delta v_{CP}| = |\Delta v_{xLV}| + |\Delta v_{CP}| > |\Delta v_{xLV}| \quad \text{Equation 2}$$

The LVBN voltage variation in the ZVS transition state will be bigger than and hence out of the envelope/voltage variation of $v_{xLV}$. The magnitude of this stress was analyzed by solving the equivalent circuit in FIG. 7C. Note that the oscillations between the MV ground inductance (8.54 pH) and the nF-level capacitances were negligible, because the oscillation frequency is more than 10 MHz which can be easily damped by parasitic resistances in the grounding path. Moreover, the duration of the ZVS transition state $T_{ZVS}$ depends on when the resonant capacitor $C_{rMV}$ will be discharged to the voltage level of $C_{fMV}$, i.e., 0 V to −2 kV considering the worst case for the M-S4T prototype. With larger magnetizing current $i_m$, the discharge speed (dv/dt) is faster, and the duration $T_{ZVS}$ is shorter. However, the voltage stress $\Delta v_{LVBN}$ is irrespective of the specific $i_m$ value because the voltage stress depends on the charge $$\int_t^{t+T_{ZVS}} i_m dt$$

which translates to $\Delta v_{CrMV}$. This can also be verified by solving the impedance divider in FIG. 7C to arrive at the additional voltage stress $\Delta v_{LVBN}$ in Equation 3, which does not contain $i_m$.

$$\Delta v_{LVBN} = \Delta v_{CN} = \Delta v_{CrMV} \frac{C_{ps\_bot}}{C_{ps\_bot} + C_{N\_eq} + C_{branch1}} \quad \text{Equation 3}$$

where the worst case of $\Delta v_{CrMV}$ is −2 kV as previously mentioned, and $C_{branch1}$ is defined in Equation 4.

$$C_{branch1} = \frac{C_{rLV}(C_{P\_eq} + C_{ps\_top})}{C_{rLV} + C_{P\_eq} + C_{ps\_top}} \quad \text{Equation 4}$$

According to Equations 3-4, smaller $C_{P\_eq}$ and $C_{N\_eq}$ result in larger additional voltage stress $\Delta v_{LVBN}$, which means that device modules with smaller capacitances can exacerbate this issue. Through FIG. 7C, it can be better understood why cause 1 is significant during the ZVS transition state but not an issue during the active vectors. During the MV active vector, the filter capacitor $C_{fMV}$ is in parallel with $C_{rMV}$ in FIG. 7C to transfer energy between the MV output and the dc-link inductance ($L_m$), and shunts $i_m$ from leaking through other paths. Thus, much smaller current flows through the device capacitances, and actually $\Delta v_{CrMV}$ would equal $\Delta v_{CfMV}$ which is small switching ripple. On the other hand, during the LV active vector, a pair of LV devices is turned on with de-link current flowing through for energy transfer, and the voltages that the other LV devices block are well defined by the LV filter capacitor voltage $v_{CfMV}$.

To address the voltage stress issue from cause 1, in some embodiments of the present disclosure, $C_{xfmr1}$ (also shown as $C_{x1}$ in the figures) and $C_{xfmr2}$ (also shown as $C_{x2}$ in the figures) as shown in FIG. 10 can be connected between MFT LV terminals and ground to divert the current from flowing through the device capacitances. The capacitor transformers can divert current away from the semiconductor devices in the CSI bridges, such that the current through the devices and the voltage stress across the devices are reduced. The impedance divider in FIG. 7D can be solved to derive the additional voltage stress $\Delta v_{LVBN}$ in Equations 5-6.

$$\Delta v_{LVBN} = \Delta v_{CN} = \Delta v_{CrMV} \frac{C_{ps\_bot}}{C_{ps\_bot} + C_{N\_eq} + C_{branch2} + C_{xfmr2}} \quad \text{Equation 5}$$

$$C_{branch2} = \frac{C_{rLV}(C_{P\_eq} + C_{ps\_top} + C_{xfmr1})}{C_{rLV} + C_{P\_eq} + C_{ps\_top} + C_{xfmr1}} \quad \text{Equation 6}$$

The additional voltage stress $|\Delta v_{LVBN}|$ in Equation 5 with the parameters of the M-S4T prototype under the worst-case −2 kV $\Delta v_{CrMV}$ and parameters $C_{xfmr}=C_{xfmr1}=C_{xfmr2}$ is illustrated in FIG. 8. The sum of the top and bottom inter-winding capacitances of the MFT is directly measured. Though the top and the bottom inter-winding capacitances of the MFT are expected to have very similar values due to symmetrical transformer structure, to ensure a robust design, the top $C_{ps\_top}$ and the bottom $C_{ps\_bot}$ inter-winding capacitances are swept from equal to 50% differences in FIG. 8A. Furthermore, to ensure robustness, the equivalent capacitances $C_{P\_eq}$ and $C_{N\_eq}$ are swept from 20% of the values through 100% to 500% in FIG. 8B, though the capacitance variations of the devices are typically less than 200% close to the nominal voltage. In FIGS. 8C-D, parameter sweepings on only $C_{P\_eq}$ variation and only $C_{N\_eq}$ variation are depicted, respectively. According to FIG. 8, the additional voltage stress is limited to about 80 V with 30 nF $C_{xfmr}$, considering the application of the 650 V devices on the LV side. A standard capacitance value of 27 nF was thus applied.

Figure 7E:
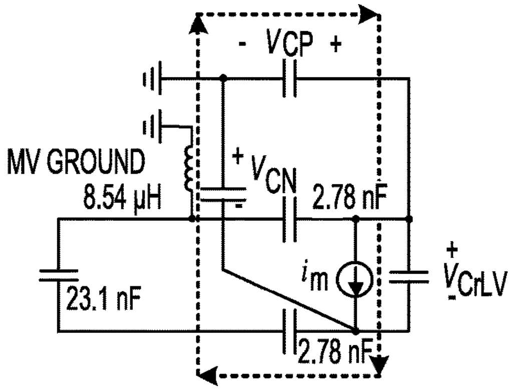
Figure 8A:
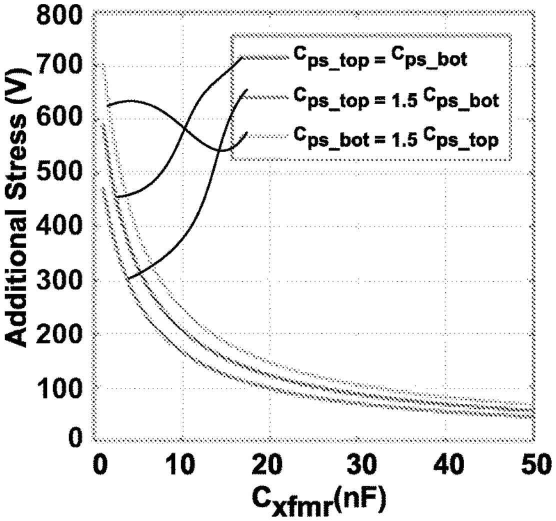
FIGS. 8A-D illustrate plots of voltage stress versus $C_{xfmr}$ capacitance across variations of inter-winding capacitances (FIG. 8A), device capacitances of both $C_{P\_eq}$ and $C_{N\_eq}$ (FIG. 8B), only $C_{P\_eq}$ (FIG. 8C), and only $C_{N\_eq}$ (FIG. 8D), in accordance with an exemplary embodiment of the present disclosure.
Figure 8B:
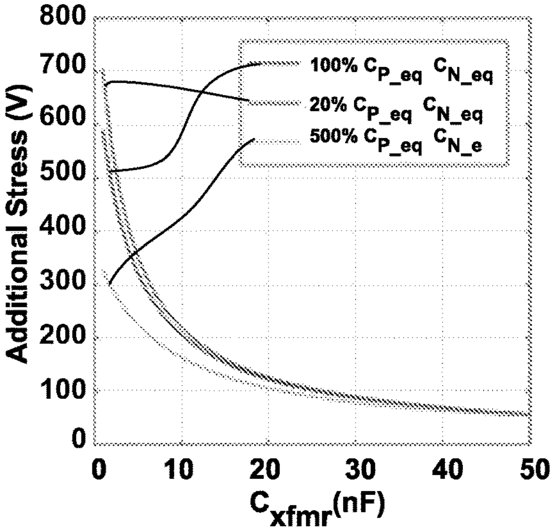
Figure 8C:
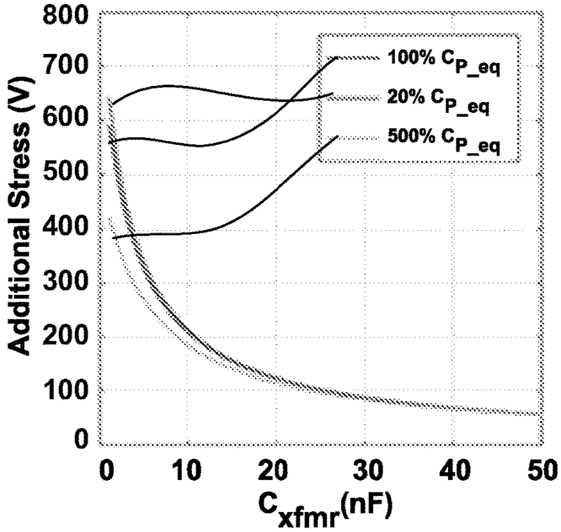
Figure 8D:
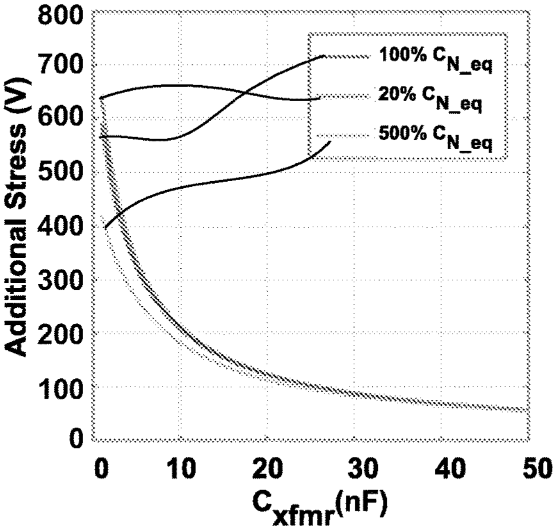

In FIGS. 7A-D, the case that the magnetizing current ($i_m$) concentrates on the MV side is shown. To further understand why $i_m$ flows on the MV side is the key issue, the equivalent circuit of the case that the magnetizing current ($i_m$) concentrates on the LV side is illustrated in FIG. 7E. It can be observed that both $C_{P\_eq}$ and $C_{N\_eq}$ are discharged by $i_m$, i.e., $\Delta v_{CN}<0$, $\Delta v_{CP}<0$, $\Delta v_{CrLV}<0$, and Equation 7 holds.

$$|\Delta v_{CN}| = |\Delta v_{LVBN}| < |\Delta v_{xLV}| \quad \text{Equation 7}$$

Therefore, the LVBN voltage variation in this case is within the envelope/voltage variation of $v_{xLV}$ and there is no additional voltage stress. Finally, for this M-S4T prototype with a 6:1 MFT, concerning cause 1, the dual case on the MV side device is less of an issue. The reason is that in Equation 3, a factor of the MV resonant-capacitor voltage variation $\Delta v_{CrMV}$, e.g., −2 kV results in a relatively large stress for 650 V LV devices. However, the dual of this case is trivial, where a factor of the LV resonant-capacitor voltage variation $\Delta v_{CrLV}$, e.g., −2 kV/6 can result in a relatively small stress for 3.3 kV MV devices.

Cause 2 and Solution

Figure 9:
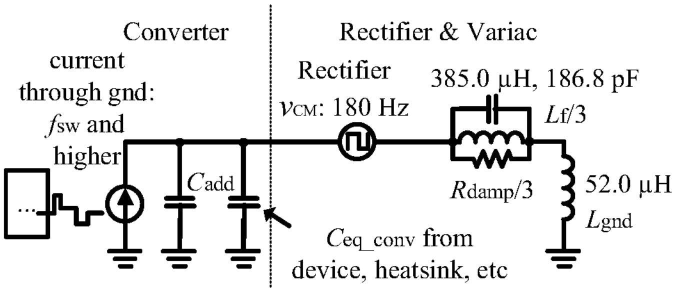
FIG. 9 illustrates the Cause 2 of voltage stress, namely device capacitances and other parasitics resonate with grounding-loop inductance, in which an additional capacitor ($C_{add}$) can shift the LC resonant frequency away from the excitation source and reduce the amplitude of voltage variation across the device. $v_{CM}$ from rectifier is of much lower frequency and smaller amplitude and hence not as problematic, in accordance with an exemplary embodiment of the present disclosure.

While FIG. 7 shows the interaction of parasitic capacitances inside the M-S4T through the MV-to-LV ground path, i.e., Cause 1, FIG. 9 illustrates the interaction between the converter and the LV-side grounding-loop inductance of the source, which corresponds to the LC-type resonance in FIG. 5, referred to herein as "cause 2" of the voltage stress. The converter can be replaced by its Norton equivalence and the rectifier in FIG. 3 can be replaced by its Thevenin equivalence with a 180 Hz common-mode voltage source. The high-frequency-excitation current source of the converter is the current through ground in FIG. 7C-D. $C_{eq\_conv}$ in FIG. 9 is the equivalent input capacitance of the M-S4T to the ground. In some embodiments of the present disclosure, to mitigate the LC resonance in FIG. 9, the corresponding LC resonant frequency where the LC parallel resonant tank's impedance peaks can be shifted away from the excitation current source frequency ($f_{sw}$) by adding $C_{add}$ and damping resistor $R_{damp}$ across the rectifier filter inductors in FIG. 3. In particular, the dampening resistor can be configured to damp out the LC oscillation between the rectifier filter and other inductances in the grounding loop and the equivalent capacitance of the CSI bridge and the transformer. The $C_{add}$ can be configured to increase the equivalent capacitance of the CSI bridge and the transformer, such that the LC oscillation frequency can be decreased below the switching frequency of the transformer to mitigate the LC oscillation. The resonant frequency and the damping ratio of this equivalent circuit can be calculated as given by Equations 8 and 9.

$$f_{res} = \frac{1}{2\pi\sqrt{(L_f/3 + L_{gnd})(C_{add} + C_{eq\_conv})}} < f_{sw} \quad \text{Equation 8}$$

$$\zeta = \frac{1}{2 \cdot R_{damp}/3}\sqrt{\frac{L_f/3 + L_{gnd}}{C_{add} + C_{eq\_conv}}} > 1 \quad \text{Equation 9}$$

Based on Equations 8 and 9, the final values of $C_{add}$ and $R_{damp}$ were selected to be 752 nF and 39 Ohm, respectively, for this exemplary embodiment. $C_{add}$ can be much larger than $C_{eq\_conv}$ and hence can dominate the total capacitance seen by the rectifier.

FIG. 10 provides an exemplary topology addressing both Cause 1 and Cause 2. In the single-module case of FIG. 10A, the dual of the LV-side grounding capacitances including $C_{x1}$ and $C_{add}$ is similarly applied on the MV side. The LV-side grounding capacitances Cad can be split among phases, because the filter capacitors with much smaller impedance are equivalent to short circuits in FIG. 7A. Note that if the MFT has a high turns ratio for step down, e.g., 6:1 in the M-S4T prototype, the LV-side stress referred to the MV side can be a small value to the MV devices as discussed, which means $C_{x2}$ can be optional. However, if the MFT has a unity turns ratio, the voltage stress referred from the other side can be non-negligible, which means $C_{x2}$ can be used. When FIG. 7A is introduced, it has been discussed that the series-stacked module 2 is confronted with the same situation as the module 1, because the filter capacitors are short circuits in the analysis and the frequency concerning cause 1. Thus, the exemplary voltage stress mitigation techniques can be extended to the ISOP modules in FIG. 10B. The line-frequency voltage blocked by $C_{ad2}$ can be further reduced by lumping $C_{ad2}$ to the module closest to the MV ground, as shown in FIG. 10C. While a two-module case is illustrated in FIG. 10, a larger number of module is also possible as will be verified in the experimental section below.

Experimental Results with the Exemplary Voltage Stress Mitigation Techniques

Figure 11:
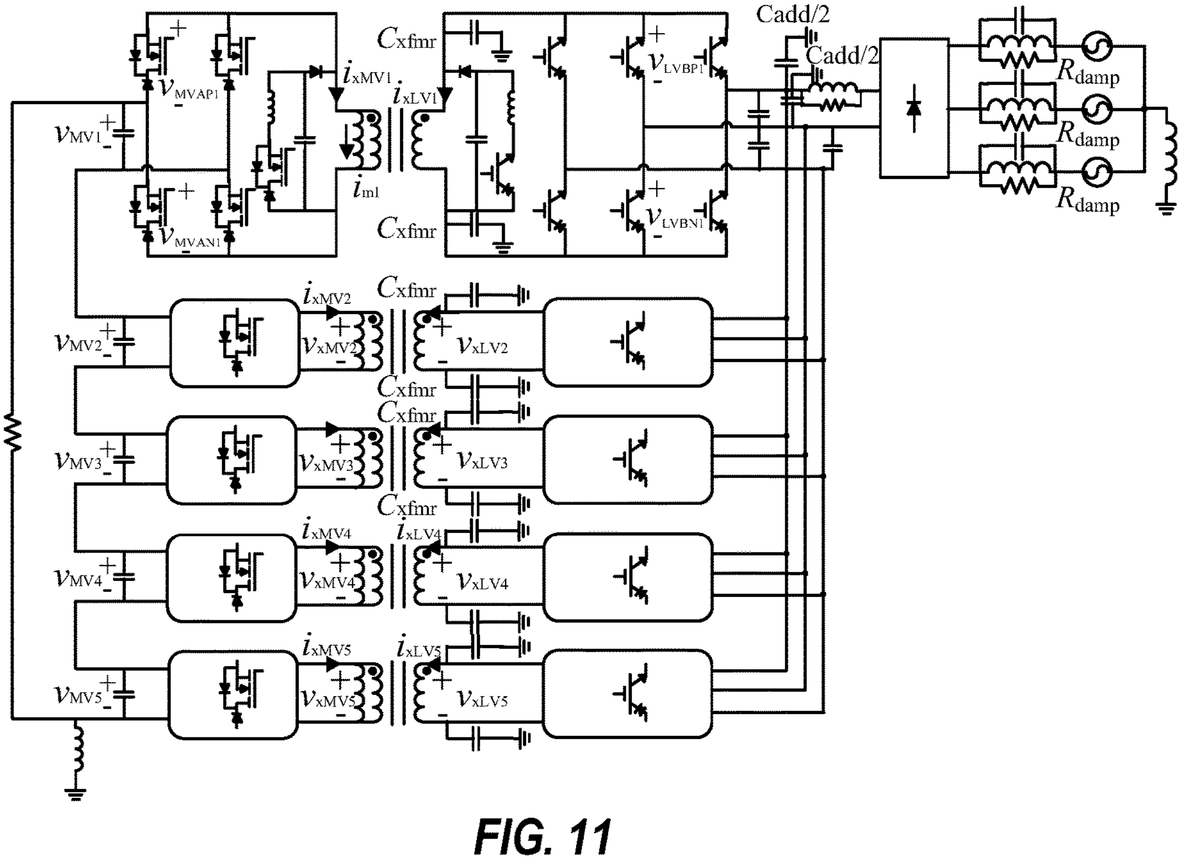
FIG. 11 provides a schematic of an experimental setup of a soft-switching solid-state power transformer implementing $C_{xfmr}$, $C_{add}$, and $R_{damp}$ for voltage stress mitigation, in accordance with an exemplary embodiment of the present disclosure.
Figure 12A:
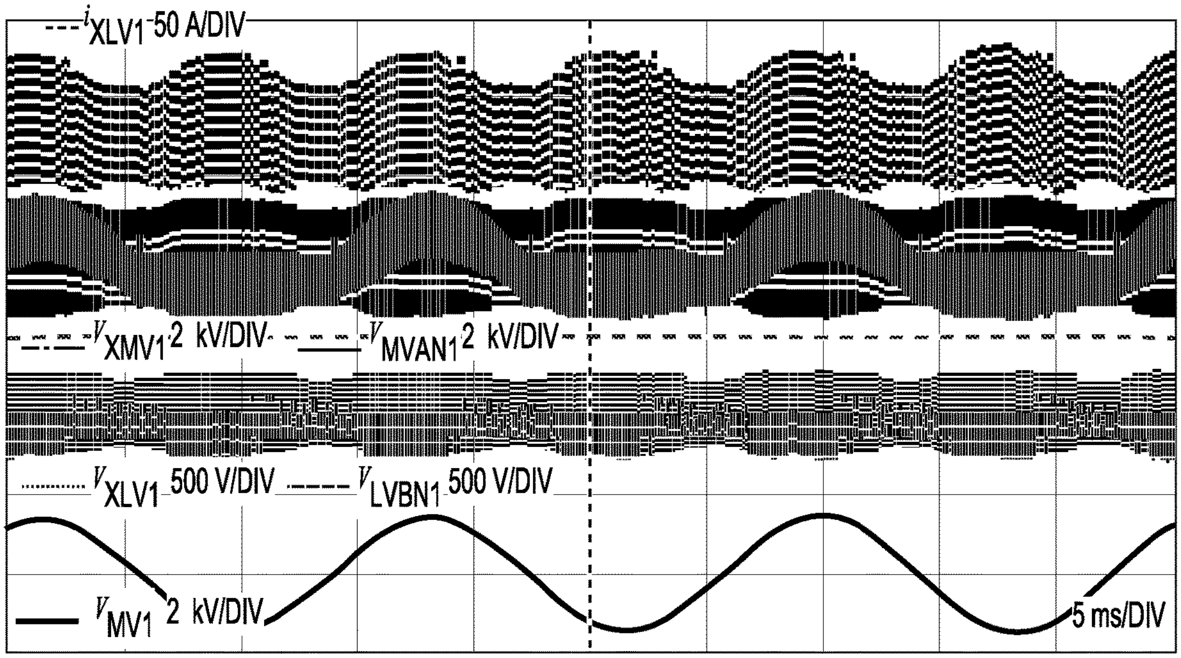
FIGS. 12A-12D provide single-module waveforms at 1.5 kV (FIG. 12A) peak with an exemplary soft-switching solid-state power transformer implementing voltage stress mitigation techniques and zoom-in at MVAC (FIG. 12B) peak, (FIG. 12C) zero crossing, and (FIG. 12D) valley in accordance with an exemplary embodiment of the present disclosure.
Figure 12B:
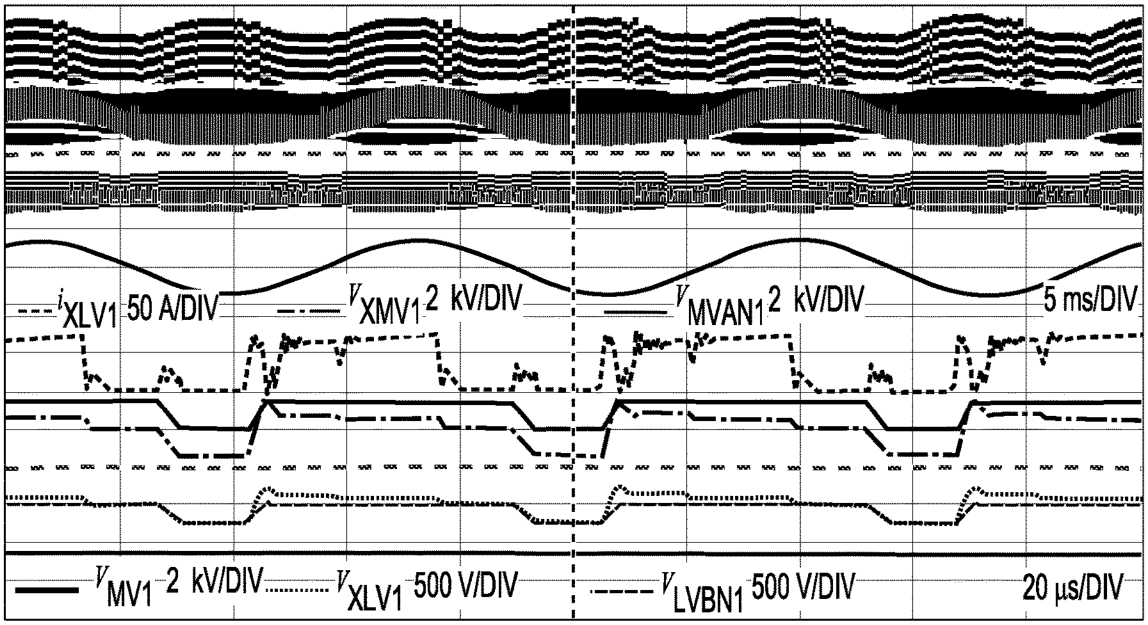
Figure 12C:
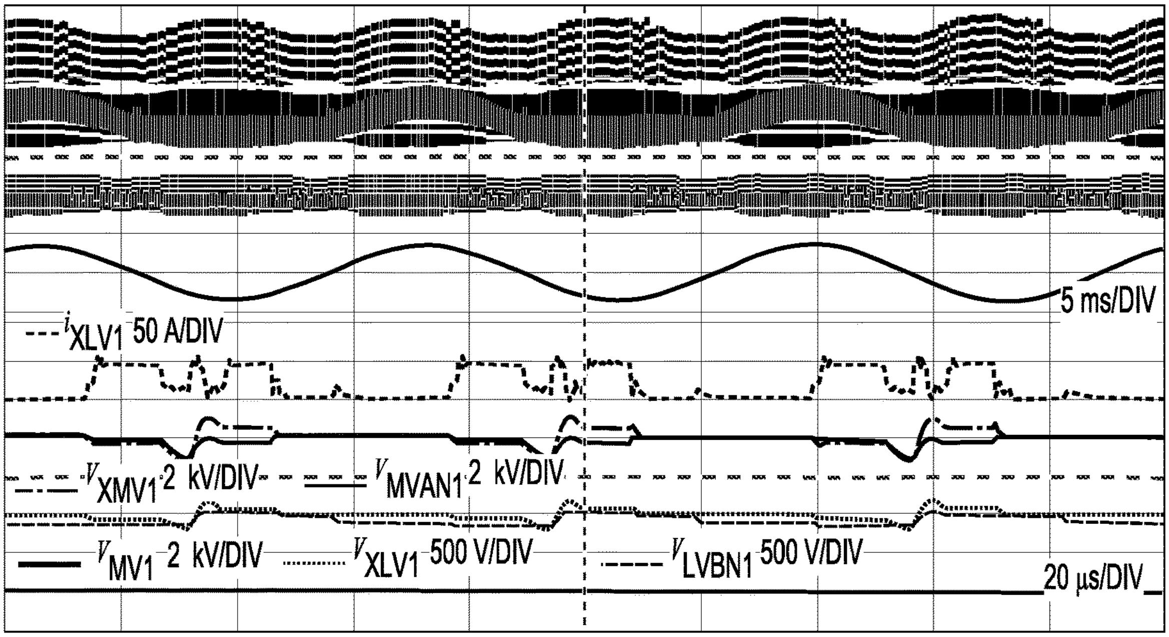
Figure 12D:
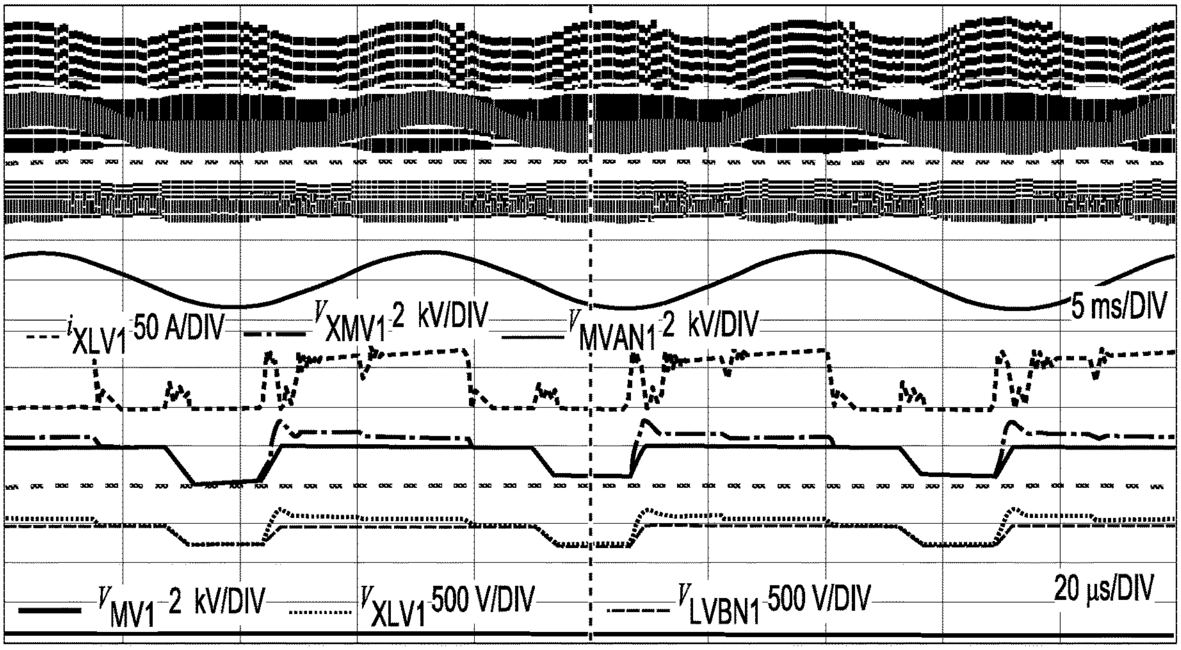
Figure 13A:
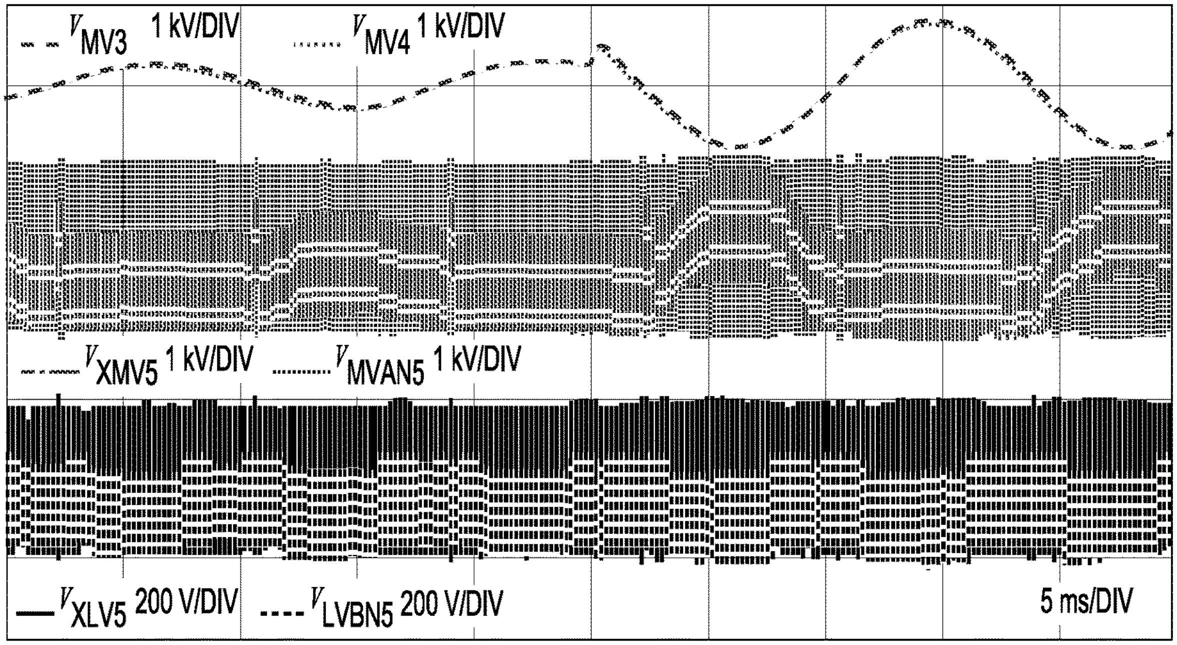
FIGS. 13A-13E provide stacked-module waveforms (FIG. 13A) under step change from 1.5 kV peak to 4 kV peak with an exemplary soft-switching solid-state power transformer implementing voltage stress mitigation techniques and zoom-in at (FIG. 13B) step-change instant, (FIG. 13C) MVAC peak, (FIG. 13D) MVAC zero crossing, and (FIG. 13E) MVAC valley, in accordance with an exemplary embodiment of the present disclosure. There were five modules in this experiment, though two modules' output voltages are shown.
Figure 13B:
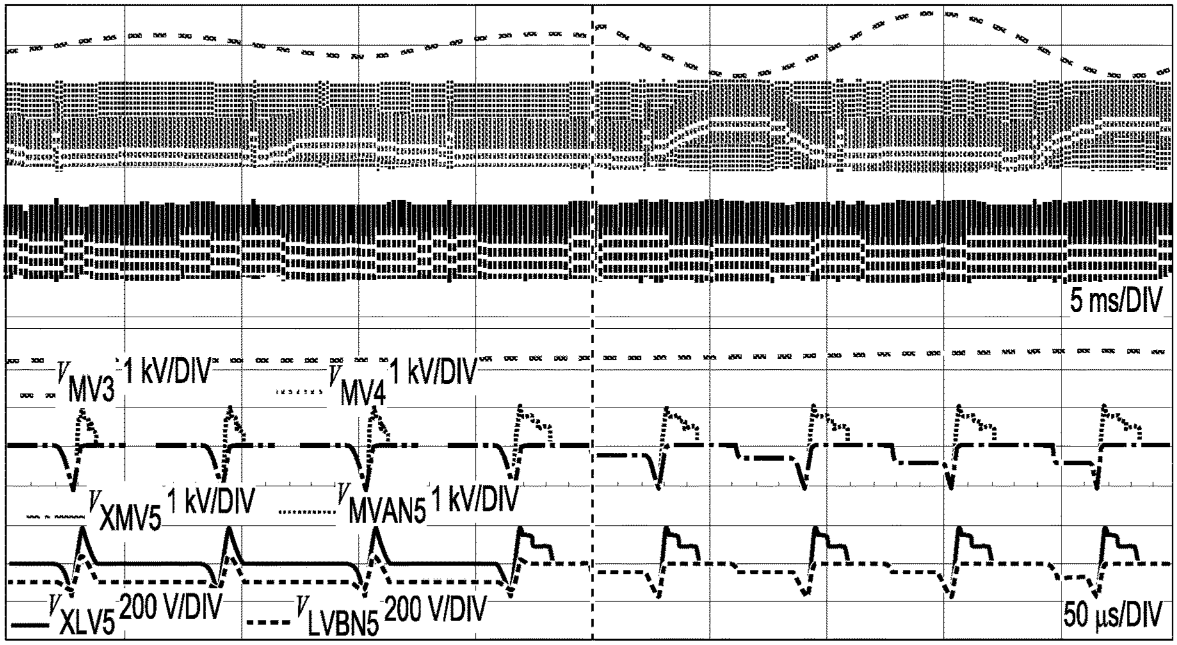
Figure 13C:
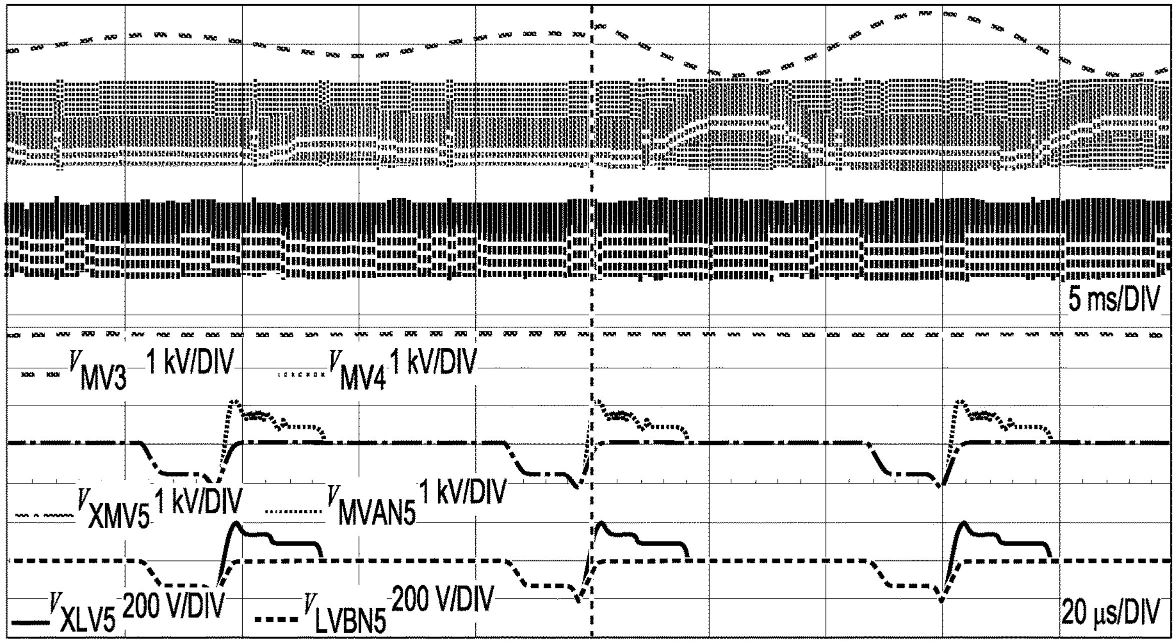
Figure 13D:
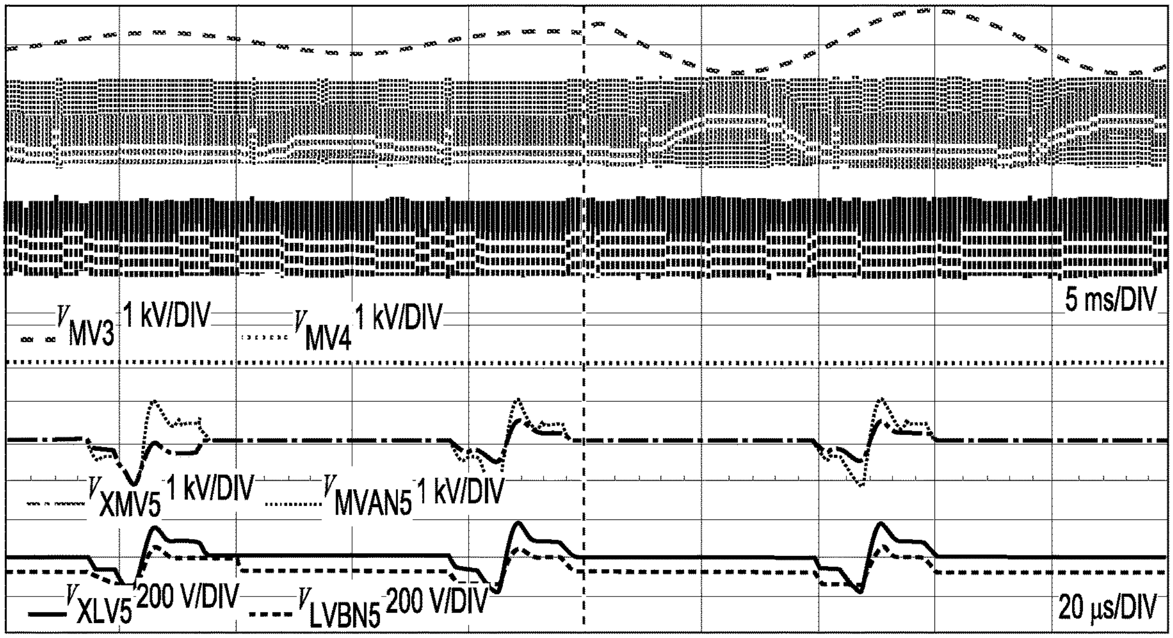
Figure 13E:
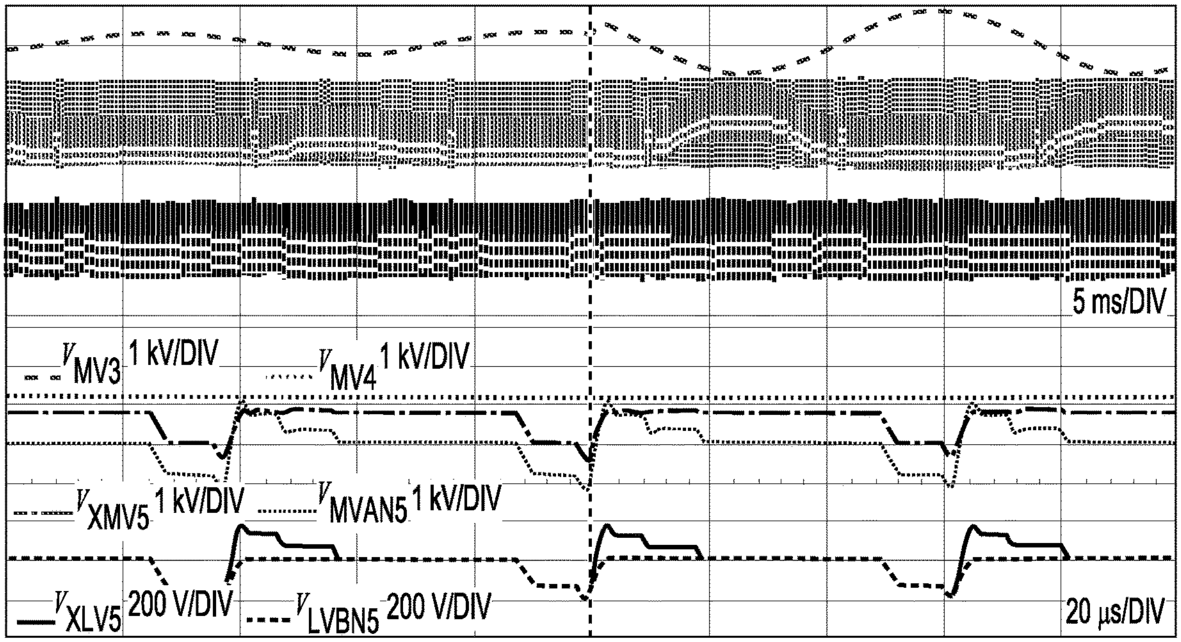

The M-S4T prototype and setup in FIG. 2 were used to verify the existence of the voltage stress issue from the ground current as shown in FIGS. 5-6 in the single-module and the stacked-module tests. To verify the effectiveness of the proposed exemplary voltage stress mitigation techniques, $C_{xfmr}$, $C_{add}$, and $R_{damp}$ were installed in FIG. 11, which shows an exemplary embodiment of the present disclosure, as compared to FIG. 3, depicting a conventional topology, where the parameters are selected as 27 nF, 752 nF, and 39 Ohm as discussed, respectively. $C_{x2}$ in FIG. 10C was not required in this M-S4T with 6:1 turns ratio MFTs.

FIG. 12 shows single module testing results at 1.5 kV peak with an exemplary voltage stress mitigation technique. Compared to FIG. 5 where the LC resonance results in voltage stress as high as 180%, the LC resonance is suppressed in FIG. 12. The LV device voltage $v_{LVBN1}$ is within the transformer LV voltage $v_{xLV1}$ envelope in FIG. 12A, which verifies the exemplary voltage stress mitigation techniques. Moreover, the MV device voltage $v_{MVAN1}$ is within the transformer MV voltage $v_{xMV1}$ envelope. FIGS. 12B-D show the zoom-in waveforms of the device voltages on both the MV side and the LV side at different positions in a line cycle to further verify the effectiveness of the exemplary voltage stress mitigation techniques under single-module operation.

FIGS. 13A-13E show stacked module testing results under step change from 1.5 kV to 4 kV peak with the exemplary voltage stress mitigation techniques. Both 4 kV peak steady-state operation and step-change transient can be observed. Note that all the five modules in FIG. 11 were in operation in this experiment, where two modules' output voltages are measured. Compared to FIG. 6 where the LVBN voltage is discharged out of the envelope of $v_{xLV}$ with a voltage stress as high as 140%, the device voltage $v_{LVBN5}$ is within the transformer voltage envelopes $v_{xLV1}$ in FIGS. 13A-B under steady-state and transient conditions, which verifies the exemplary voltage stress mitigation techniques. Moreover, the MV device voltage $v_{MVAN1}$ is within the transformer MV voltage $v_{xMV1}$ envelope. Finally, the MV output voltages of the stacked modules are balanced and sinusoidal. The zoom-in waveforms in FIG. 13C-E further verify the exemplary voltage stress mitigation techniques at different positions in a line cycle. The inherent parameter variations among the five modules in the prototype verify the robustness of the exemplary voltage stress mitigation techniques in this stacked-module experiment. To summarize, the experimental waveforms verify the effectiveness of the exemplary voltage stress mitigation techniques under both single-module and stacked-module conditions during both steady state and dynamics.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A soft-switching solid-state power transformer comprising:

- a transformer comprising first and second winding connections;
- a first auxiliary resonant circuit coupled to the first winding connection of the transformer, the first auxiliary resonant circuit comprising:
  - a resonant capacitor coupled across the first winding connection; and
  - a resonant inductor coupled across the first winding connection in parallel with the resonant capacitor;
- a leakage diode coupled in series with the transformer between the transformer and the first auxiliary resonant circuit;
- a first current-source inverter (CSI) bridge coupled to the first auxiliary resonant circuit, the first CSI bridge comprising reverse blocking switches configured to conduct current in one direction and block voltage in both directions;
- voltage stress mitigation means configured to mitigate voltage stress across one or more semiconductors of the first CSI bridge;
- a second auxiliary resonant circuit coupled to the second winding connection of the transformer; and
- a second CSI bridge coupled to the second auxiliary resonant circuit, the second CSI bridge comprising reverse blocking switches configured to conduct current in one direction and block voltage in both directions;

wherein:

the leakage diode is configured to manage leakage inductance of the transformer;

the voltage stress mitigation means comprises a first transformer capacitor coupled to a high voltage side of the first winding connection and a ground; and the first transformer capacitor is configured to divert current away from the one or more of the semiconductors of the first CSI bridge to mitigate the voltage stress across the one or more semiconductors.

2. The power transformer of claim 1, wherein:

the voltage stress mitigation means further comprises:

a second transformer capacitor coupled to a low voltage side of the of the first winding connection and the ground;

the first and second transformer capacitors are configured to first divert current away from one or more semiconductors of the first CSI bridge.

3. The power transformer of claim 2, wherein the first transformer capacitor has a capacitance equal to a capacitance of the second transformer capacitor.

4. The power transformer of claim 2 further comprising:

a third transformer capacitor coupled to a high voltage side of the second winding connection and the ground.

5. The power transformer of claim 4 further comprising:

a fourth transformer capacitor coupled to a low voltage side of the second winding connection and the ground;

wherein the fourth transformer capacitor has a capacitance equal to a capacitance of the third transformer capacitor.

6. A power transformer system comprising:

a first power transformer comprising the power transformer of claim 1; and a second power transformer comprising the power transformer of claim 1;

wherein the first and second power transformers are coupled in parallel.

7. The power transformer system of claim 6 further comprising:

a third power transformer comprising the power transformer of claim 1;

a fourth power transformer comprising the power transformer of claim 1; and a fifth power transformer comprising the power transformer of claim 1;

wherein the power transformers are coupled in parallel.

8. The power transformer of claim 1 further comprising:

rectifier filters, each of the rectifier filters comprising:

a rectifier capacitor;

a rectifier inductor in parallel with the rectifier capacitor; and a dampening resistor in parallel with the rectifier inductor;

wherein:

the first CSI bridge further comprises phase legs; and a respective one of the rectifier filters is coupled to a respective one of the phase legs.

9. The power transformer of claim 8, wherein the dampening resistor is configured to dampen LC oscillation between the rectifier filter and inductances in a grounding loop of the transformer.

10. The power transformer of claim 8 further comprising:

distinct capacitors;

wherein:

a respective one of the distinct capacitors is coupled to a respective one of the phase legs and the ground; and a respective one of the distinct capacitors is in parallel with a respective one of the rectifier filters.

11. A soft-switching solid-state power transformer comprising:

a transformer comprising first and second winding connections;

a first transformer capacitor coupled to a high voltage side of the first winding connection and a ground;

a first auxiliary resonant circuit coupled to the first winding connection of the transformer, the first auxiliary resonant circuit comprising:

a resonant capacitor coupled across the first winding connection; and a resonant inductor coupled across the first winding connection in parallel with the resonant capacitor;

a leakage diode coupled in series with the transformer between the transformer and the first auxiliary resonant circuit;

a first current-source inverter (CSI) bridge coupled to the first auxiliary resonant circuit, the first CSI bridge comprising reverse blocking switches configured to conduct current in one direction and block voltage in both directions;

a first CSI bridge/ground capacitor coupled to the first CSI bridge and the ground; and a rectifier filter coupled to the first CSI bridge comprising:

a rectifier capacitor;

a rectifier inductor in parallel with the rectifier capacitor; and a dampening resistor in parallel with the rectifier inductor;

wherein:

the first CSI bridge/ground capacitor is:

in parallel with the rectifier filter; and configured to shift an LC resonant frequency of the first CSI bridge and the transformer away from a switching frequency of the transformer;

the leakage diode configured to manage leakage inductance of the transformer; and the first transformer capacitor is configured to divert current away from one or more semiconductors of the first CSI bridge to mitigate voltage stress across the one or more semiconductors.

12. The power transformer of claim 11, wherein the dampening resistor is configured to dampen LC oscillation between the rectifier filter and inductances in a grounding loop of the transformer.

13. The power transformer of claim 12, wherein the first CSI bridge/ground capacitor is further configured to increase an equivalent capacitance of the first CSI bridge and the transformer.

14. A soft-switching solid-state power transformer comprising:

a transformer comprising first and second winding connections;

an auxiliary resonant circuit coupled to the first winding connection of the transformer;

a leakage diode coupled in series with the transformer between the transformer and the auxiliary resonant circuit;

a first transformer capacitor coupled to a high voltage side of the first winding connection and a ground;

a second transformer capacitor coupled to a low voltage side of the of the first winding connection and the ground;

a current-source inverter (CSI) bridge coupled to the auxiliary resonant circuit, the CSI bridge comprising reverse blocking switches configured to conduct current in one direction and block voltage in both directions;

a rectifier filter coupled to the CSI bridge; and a CSI bridge/ground capacitor:

coupled to the CSI bridge and the ground; and in parallel with the rectifier filter;

wherein:

the first and second transformer capacitors are configured to divert current away from one or more semiconductors of the CSI bridge to mitigate voltage stress across the one or more semiconductors;

the leakage diode is configured to manage leakage inductance of the transformer; and the CSI bridge/ground capacitor is configured to shift an LC resonant frequency of the CSI bridge and the transformer away from a switching frequency of the transformer.

* * * * *